June 26, 1923.
E. W. SIMMONS
LAWN MOWER
Filed Aug. 10, 1921    3 Sheets-Sheet 3
1,459,998
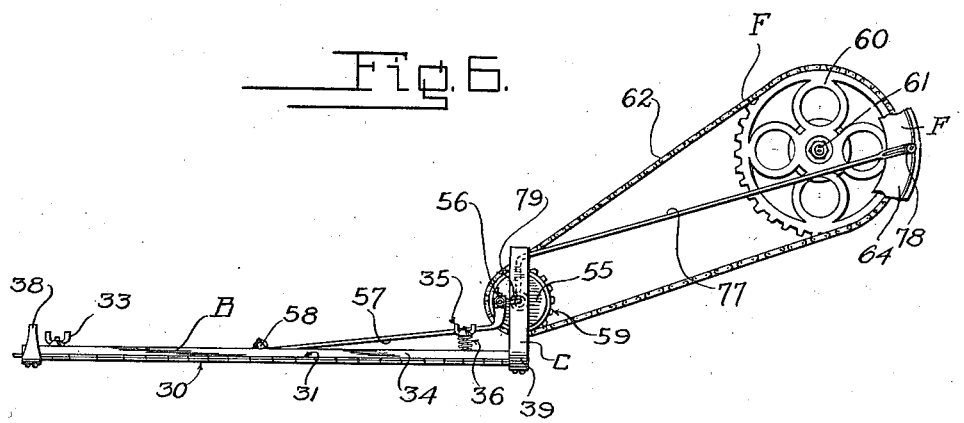
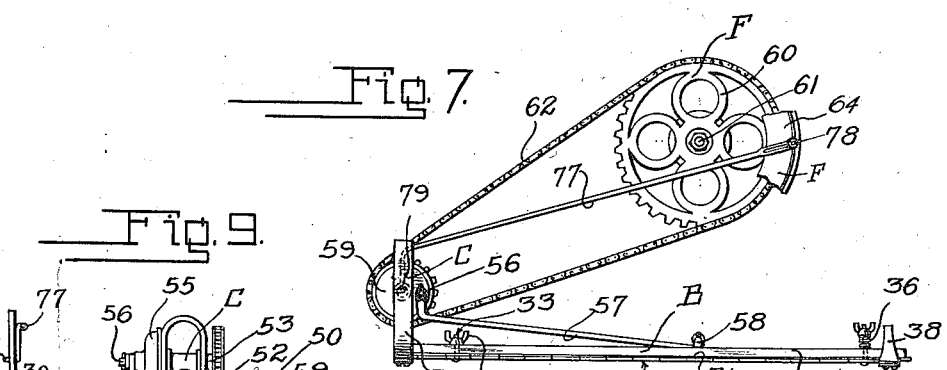
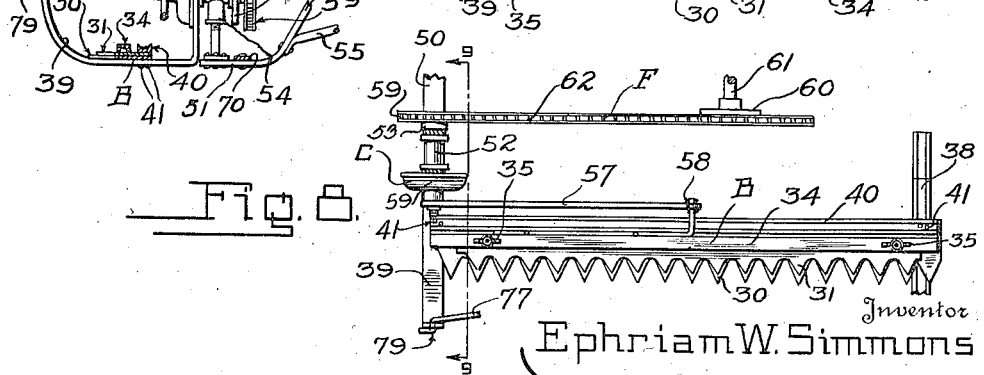
Inventor
Ephriam W. Simmons
By Lancaster and Allwine
Attorneys Patented June 26, 1923.

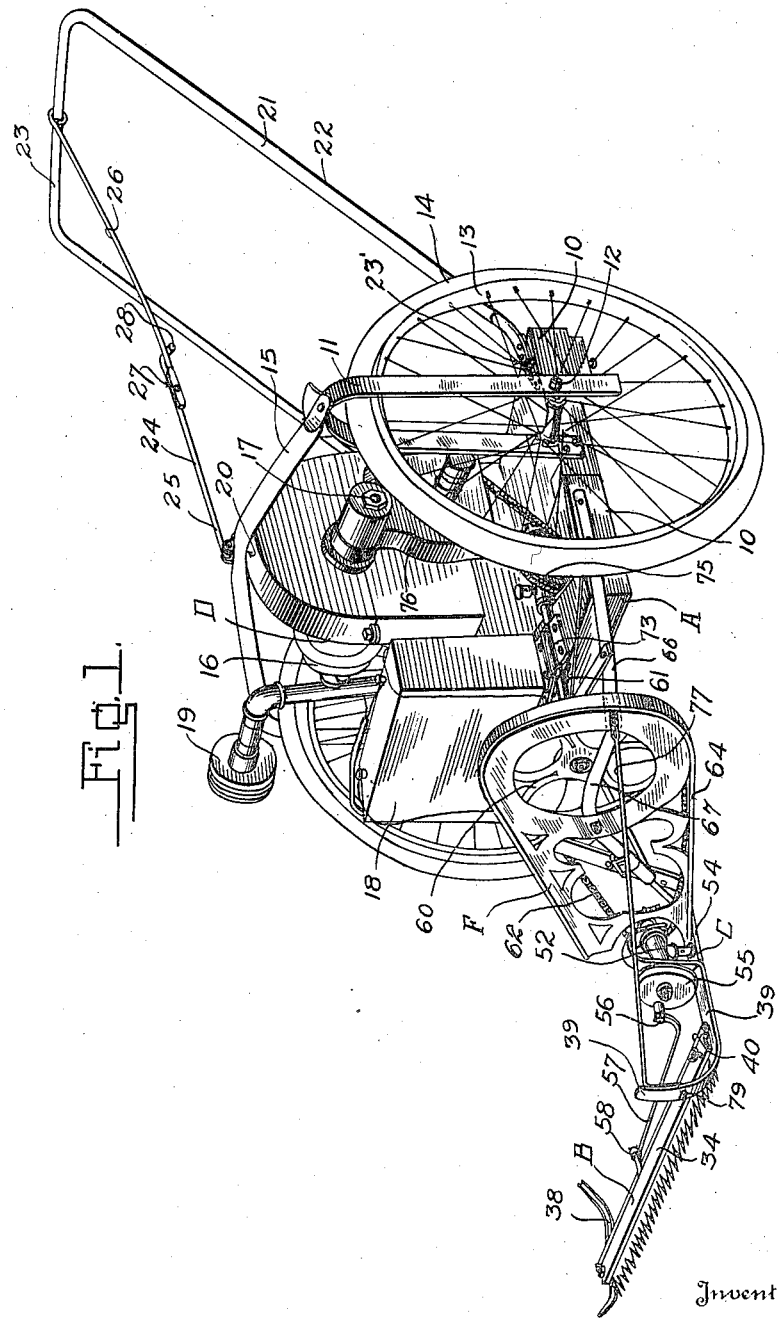

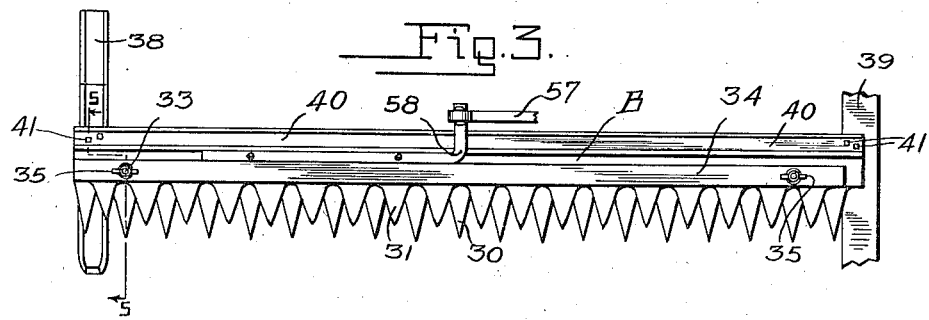
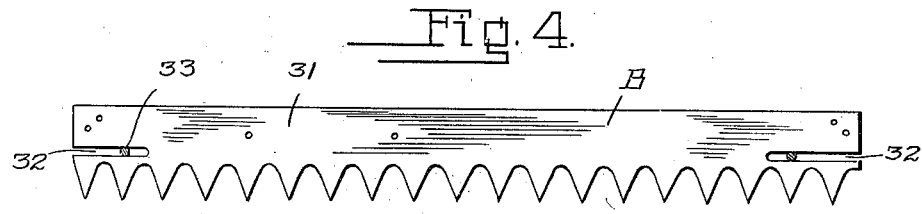
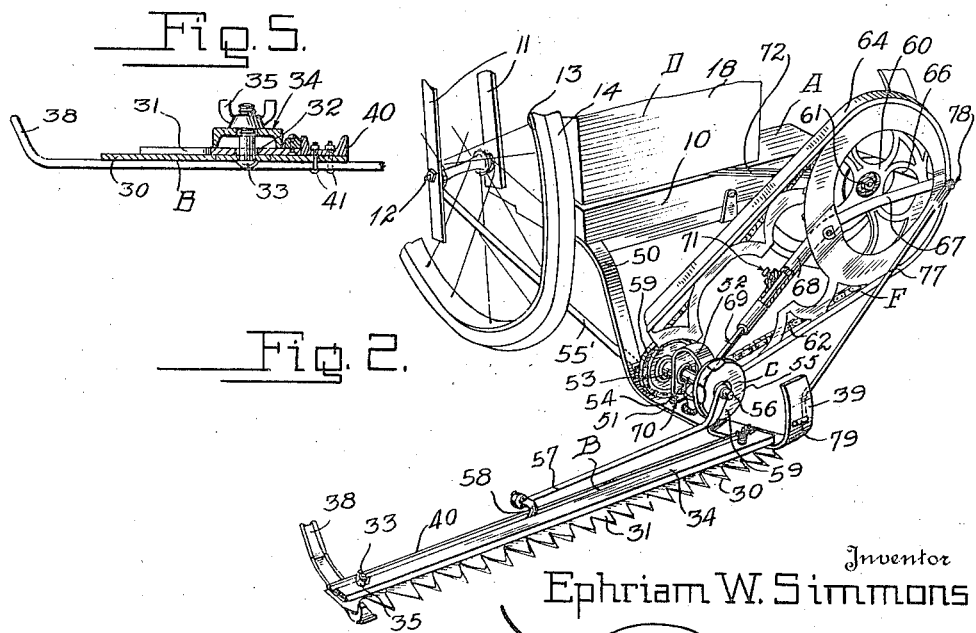
Inventor
Ephriam W. Simmons

1,459,998

UNITED STATES PATENT OFFICE.

EPHRIAM W. SIMMONS, OF CORINTH, MISSISSIPPI.

LAWN MOWER.

Application filed August 10, 1921. Serial No. 491,192.

*To all whom it may concern:*

Be it known that I, EPHRIAM W. SIMMONS, a citizen of the United States, residing at Corinth, in the county of Alcorn and State of Mississippi, have invented certain new and useful Improvements in Lawn Mowers, of which the following is a specification.

This invention relates to mowers, and more particularly to lawn mowers, and the primary object of the invention is to provide a light lawn mower embodying a power driven cutter bar for cutting lawns having a relatively large area, which can be placed upon the market at a reasonable cost, and which can be readily operated by the ordinary layman.

Another object of the invention is the provision of an improved lawn mower, embodying a wheeled frame having a cutting bar associated therewith, and an internal combustion engine operatively connected to said cutter bar, the wheeled frame having means associated therewith to permit the ready pushing of the mower over a lawn in an expeditious manner, the whole device being so arranged as to permit a lawn to be conveniently and quickly mowed with a minimum amount of effort.

A further object of the invention is the provision of a lawn mower having a power driven cutter bar, embodying a novel form of frame, on which is adapted to be mounted the engine, and the other operating parts of the improved device, such frame being of exceptionally light and durable construction, and so constructed as to permit the device to be readily pushed over a lawn or yard.

A still further object of the invention is the provision of a novel means for associating the cutter bar with the wheeled frame, so as to permit the cutter bar to be disposed either directly in front of the frame, or at one side thereof, said means also permitting the cutter bar to extend at an angle to the horizontal, so as to facilitate the cutting of slopes, embankments, ditches or the like, and to permit the machine to readily conform to the general curvature of the lawn over which the machine is being operated.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a perspective view of the improved lawn mower.

Figure 2 is a fragmentary perspective view of the improved lawn mower looking in the opposite direction from that of Figure 1.

Figure 3 is a top plan view of the cutter bar.

Figure 4 is a top plan view of the movable cutter blade, showing the guide bolts therefor in section.

Figure 5 is an enlarged transverse section through the cutter bar taken on the line 5—5 of Figure 3.

Figure 6 is a front elevation of the improved cutter bar and associate parts, and illustrating the means for operatively connecting the cutter bar with the drive shaft and showing the cutter bar arranged laterally of the drive shaft.

Figure 7 is a similar view, showing the cutter bar arranged directly in front of the drive shaft.

Figure 8 is a plan view of the cutter bar and its associate parts illustrating the means of connecting the same to the frame of a mower.

Figure 9 is a section taken on the line 9—9 of Figure 8, illustrating the improved means of operatively connecting the cutter bar with the frame of the mower.

Referring to the drawings in detail, wherein similar reference characters designate corresponding parts throughout the several views, the letter A indicates the frame of the machine; B the novel cutter bar; C the novel means of connecting the cutter bar to the frame; D, the power operating means for the cutter bar; and F the means for operatively connecting the cutter bar with said power means.

The frame A of the improved lawn mower consists of a retangular shaped bed plate 10. This bed plate can be made of wood or metal, or can be of a built up construction, of structural iron. The opposite side faces of the bed plate has bolted or otherwise secured thereto, the U-shaped wheel guard supports 11. These guard members 11 are disposed in an inverted position with their bight portions uppermost and their free ends lowermost, and their free ends support axles 12 upon which are rotatably mounted the ground wheels 13. The ground wheels 13 are preferably mounted upon roller or ball bearings, and are of a strong, light construction, such as the ordinary bicycle or motorcycle wheel, and the rims thereof may have mounted thereon ordinary pneumatic tires 14. The upper terminals of the U-shaped wheel guard frames 11 are connected by a suitable transverse cross brace 15. The bed plate 10 has secured thereon, in any preferred manner the power plant D, which as shown, is of the internal combustion engine type. This engine may be of any preferred make or size, best suited for the purpose intended, and includes a frame 16 and the drive shaft 17. The engine is adapted to have arranged on the platform 10 in any preferred manner, its associate parts, such as a storage battery 18, the muffler 19, and the like. As shown, the transverse cross brace 15 is attached, as at 20 to the frame 16 of the engine, so as to add rigidity to the entire device.

The frame A is adapted to be pushed over the lawn or other field to be mowed, by hand, and is provided with a handle construction 21. This handle construction 21 is of a U-shape, as clearly shown in Figure 1 of the drawings, and has the terminals of its legs 22 hingedly connected as at 23' to the rear edge of the bed plate 10. The handle is permitted to be swung up and down by means of the hinges 23', in order that an adjustment can be had, which is best suited to the needs of the person operating the mower. The bight portion 23 of the handle 21 is pivotally connected by means of a novel rod 24, with the frame. As shown, the rod 24 consists of an inner section 25 and an outer section 26. These sections have their opposite ends pivotally connected respectively to the bight portion 23 of the handle 21, and to the frame 16 of the motor D or to the cross brace 15. The sections are pivotally connected together by means of a pivot pin 27, and the inner section 25 is provided with an inner angled end 28 which limits the downward swinging of sections, and prevents the downward movement of the handle 21 beyond a predetermined point.

The cutter bar B of the improved lawn mower is arranged forwardly of the wheeled frame A and consists of a lower stationary toothed cutter bar 30, and an upper movable toothed cutting bar 31. The cutter bars 30 and 31 are arranged in superposed abutting relation, and the upper cutter bar has its terminals provided with inwardly extending guide slots 32, which receive the guide bolts 33, which extend entirely through the lower cutter bar 30. A retaining strip 34 is provided for the cutter bars and overlies the upper cutter bar 31 and is of substantially a channel beam construction. This retaining strip 34 receives the upper ends of the bolts 33, which have threaded thereon winged nuts 35. If desirable, the innermost bolt 33 may have coiled around the same, an expansion spring 36, which engages against the retaining bar or strip 34 and against the wing nut 35. This exerts a tension against the cutter bars in order to hold the same in intimate engagement with one another. This also permits the cutter bars to spread under abnormal conditions, that is, when the teeth engage a piece of wire or other hard substance, thereby preventing injury to the teeth. Outer and inner guard shoes 38 and 39 are provided for the cutter bar and these shoes are connected together by means of the channel beam brace strips 40. The bolts utilized for connecting the brace strip 40 with shoes 38 and 39 are also utilized for bolting the shoes to the lower stationary cutter plate 30, as indicated by the numeral 41. The inner shoe 39 is of a novel construction and forms a part of the connecting means C, which will now be described.

The connecting means C consists of a forwardly extending resilient supporting bar 50, which curves downwardly and terminates in a forwardly extending foot 51, which lies in substantially the same plane with the lower surface of the supporting shoe 39. The rear end of the supporting shoe 39 is bent upwardly, rearwardly and then downwardly, into a U-shape, as at 52, and is provided with bearing openings for receiving an operating shaft 53. This construction permits the shoe 39 to rock on the shaft 53, which consequently permits the raising of the outer end of the cutter bar B. The foot 51 of the supporting bar 50 has secured to its upper surface the T-bearing 54, which rotatably supports the operating shaft 53. The resilient bar 50 is connected to the lower surface of the bed plate 10, adjacent to one longitudinal end thereof, and is braced by means of a bracing rod 55', which has its upper end rigidly secured in any preferred manner to the bed plate 10. The operating shaft 53 forms a part of the operating means F, which is utilized for operatively connecting the mower bar with the internal combustion engine, and this means will now be described.

The shaft 53 has secured thereto in any preferred manner the pitman or crank wheel 55, which supports the pitman or crank pin 56. This pin, has secured thereto the pitman rod 57, which is in turn connected to a pin 58 carried by the movable toothed cutter bar 31. The rear end of the shaft 53 has keyed or otherwise secured thereto a relatively small sprocket wheel 59, which is in alignment with a relatively large sprocket wheel 60, which is keyed or otherwise secured to an operating shaft 61. The sprocket wheels 59 and 60 have trained around the same a sprocket chain 62. A guard 64 is provided for the sprocket chain 62 and the relatively large sprocket wheel 60 and conforms to the configuration thereof. This guard is held in position by means of a brace rod 66, which extends forwardly from the bed plate 10 and curved around the guard as at 67. This rod terminates in a depending hollow extension 68, which slidably supports a solid rod 69, which has its lower end secured as at 70 to the foot 51 of the resilient bar 50. A set screw 71 is carried by the hollow portion 68 of the rod 66 and forms means for holding the solid rod 69 in adjusted position. This permits the springing of the bar 50 in order to adjust the tension of the sprocket chain 62. The rod 66 and its extension are further braced by a brace bar 72, which is bolted to the bed plate 10 and extends forwardly therefrom. A shaft 61 is rotatably mounted in suitable bearings 73 carried by the upper surface of the bed plate 10. The rear end of this shaft 61 is operatively connected to the shaft 17 and the motor B by any type of speed reducing mechanism as indicated at 75. Part of this mechanism is suitably housed in a gear casing 76. A brace rod 77 may be provided for the cutter bar B, and as shown this brace rod 77 has its upper end pivotally connected as at 78 to the casing 64 and its lower end pivoted as at 79 to the shoe 39 in direct alignment with the axis of the shaft 53.

One of the important features of the invention, as heretobefore stated, is the construction of means for connecting the cutter bar B with the frame A and this construction not only permits the cutter bar to be swung at an angle, but also permits the same to be arranged in front of the machine as well as laterally thereof.

In Figure 6 of the drawings is shown the cutter bar arranged laterally of the frame, while in Figure 7 the cutter bar is shown arranged in front of the frame. When it is desired to position the cutter bar B in front of the frame, the same is unbolted from the shoes 38 and 39 and the end of the cutter bar which was bolted to shoe 38 is then bolted to shoe 39 and the end of the cutter bar which was bolted to shoe 39 has the shoe 38 bolted thereto. This positions the cutter bar in front of the frame. Prior to the removal of the cutter bar the pitman rod 57 is removed from the pitman pin 56 and the pin 58, and its position reversed. The cutter bar is then removed and placed in front of the frame after which the pitman is reconnected to the pins 56 and 58.

In use of the improved mower, the engine is started in the usual manner and controlled in the usual way, the speed reducing mechanism will be operated, thus actuating the cutter bar. The mower is then pushed over the ground by means of the handle 21.

This permits the convenient operation of the machine, and permits a lawn of a relatively large area to be readily cut, with a minimum amount of labor. Owing to the construction of the machine, the same will readily conform to the configuration of the land over which it is being operated.

Changes in details may be made without departing from the spirit or scope of this invention; but,

I claim:

1. A lawn mower comprising a frame including a rectangular shaped bed plate, a pair of inverted U-shaped wheel frames arranged on opposite sides of the bed plate, means securing the inner ends of the frames to the bed plate, relatively large wheels rotatably mounted in said wheel frames, a transversely extending brace bar connecting the frames together, a motor mounted upon said bed plate, a reciprocating cutter bar, and means operatively connecting said cutter bar with said motor.

2. A lawn mower comprising a frame including a substantially rectangular bed plate, a pair of inverted U-shaped wheel frames secured to the opposite sides of the bed plate, axles carried by each of the wheel frames, relatively large wheels rotatably mounted upon the axles, a motor mounted upon the bed plate, a reciprocating cutter bar carried by the bed plate, means operatively connecting the cutter bar with the motor, a U-shaped handle, means pivotally connecting the terminals of the handle to the bed plate, and a rod including a pair of pivotally connected links pivotally secured to said handle and to said frame, a lug formed on one of said links arranged to engage the other link to hold the handle in a predetermined position.

3. A lawn mower comprising a wheeled frame including a flat base plate, a motor carried by the base plate, a handle connected with the base plate, a forwardly extending shoe carried by the base plate, a cutter bar including a pair of spaced runners, a bearing carried by the shoe, an operating shaft rotatively mounted in the bearing, a bearing formed on one of said runners and rockably mounted upon the operating shaft, a pitman wheel and rod connection between said shaft and cutter bar, and means for operating said shaft from said motor.

4. A lawn mower comprising a wheeled frame, a handle for the frame, an internal combustion engine secured to the frame, a forwardly extending shoe carried by the frame, a bearing carried by the forward end of the shoe, an operating shaft rotatably carried by the bearing, means operatively connecting the shaft with the internal combustion engine, a cutter bar, runners for the ends of the cutter bar, a U-shaped bearing member formed on the inner runner rockably mounted upon the shaft, a pitman wheel secured to the shaft, a pitman rod secured to the wheel and to the cutter bar, the runners being detachably connected to the cutter bar to permit the mower bar to be positioned laterally or in front of said frame.

5. A lawn mower comprising a wheeled frame, a motor on the frame, an operating shaft rotatably mounted upon the frame projecting forwardly therefrom, means operatively connecting the operating shaft with the motor, a forwardly extending shoe, a bearing carried by the shoe, a shaft rotatably carried by the bearing, a forwardly extending frame carried by the first mentioned frame, a sprocket wheel and chain guard secured to the last mentioned frame, a sprocket wheel secured to the operating shaft and arranged in said guard, a sprocket wheel secured to the shaft carried by the shoe, a sprocket chain operatively connecting the sprocket wheels together, and arranged in said guard, a cutter bar including a movable toothed bar, runners detachably connected to the ends of the bar, a U-shaped extension formed on the inner end of the inner runner rockably mounted upon the shaft carried by the shoe, a pitman wheel secured to said shaft, and a pitman rod secured to the wheel and to the reciprocating toothed bar.

EPHRIAM W. SIMMONS